Jan. 5, 1960 T. L. REISSMANN ET AL 2,919,999
COLLAGEN ARTICLE AND THE MANUFACTURE THEREOF
Filed Oct. 22, 1958 6 Sheets-Sheet 4

INVENTORS
THOMAS L. REISSMANN
JOSEPH NICHOLS
BY Robert W. Kell
ATTORNEY

United States Patent Office 2,919,999
Patented Jan. 5, 1960

2,919,999
COLLAGEN ARTICLE AND THE MANUFACTURE THEREOF

Thomas L. Reissmann, Bound Brook, and Joseph Nichols, Princeton, N.J., assignors to Ethicon, Inc., a corporation of New Jersey Application October 22, 1958, Serial No. 768,970

7 Claims. (Cl. 106—161)

This invention relates to a dispersion of swollen collagen fibrils in an acid-methanol solution and to a process for obtaining such a dispersion. The collagen dispersions of the present invention are useful in the manufacture of absorbable sutures and surgical aids in the form of films, filaments, strand, tubing and sponges. Edible sausage casings have also been made from these collagen dispersions.

For the sake of clarity, the terms used herein are defined as follows:

The term "native collagen fiber," as used herein, means a thread-like collagen structure as it exists in connective tissue.

The term "swollen collagen fibril," as used herein, means a thread-like collagen structure that has been swollen in acid-methanol solution to a diameter of about 200 to 2000 Angstrom units.

The term "monofilament," as used herein, means a single thread of oriented collagen fibrils as extruded through a single orifice in a spinnerette.

The term "multifilament," as used herein, means a group of individual separate filaments extruded through a spinnerette.

The term "strand," as used herein, means a group of filaments that have been united to form a unitary structure.

The term "perfluoro acid," as used herein, means a saturated perfluorocarbon carboxylic acid having the formula $CF_3(CF_2)_nCOOH$ in which $n$ is zero or a whole integer.

The success of a process employing collagen as a basic material is often dependent upon maintaining the collagen fibril structure throughout the process. Denaturation or degradation of the collagen structure prior to or during the casting of a film, spinning of a monofilament, or extrusion of a shaped article, as a ribbon or a tube, will impair desirable qualities of the fabricated article. Prevention of serious degradation during processing, however, has always been difficult because collagen in the native state is associated with impurities and must be separated therefrom. It has been a disadvantage of the prior art processes for the manufacture of a collagen dispersion that serious denaturation and degradation of the collagen results from the mechanical, thermal and chemical steps employed to separate the collagen from associated non-collagenous impurities.

It is an object of the present invention to separate collagen from connective tissue without changing the original collagen fibril structure.

It is another object of this invention to prepare a homogeneous dispersion of swollen undenatured and undegraded collagen fibrils.

It is also an object of this invention to prepare a dispersion of unprecipitated swollen collagen fibrils that may be extruded into a dehydrating bath to form shaped articles of exceptional strength.

The objects of this invention may be realized by swelling and dispersing collagen fibrils in an aqueous methanol solution containing a perfluoro acid or a mixture of perfluoro acids. One phase of the present invention relates to the protection of the collagen given by the addition of a perfluoro acid to the protein molecule. The addition compound formed between the collagen molecule and perfluoro acid is resistant to the forces causing molecular degradation. Protection of the collagen is thus obtained during processing. After processing, removal of the perfluoro acid can be effected by washing the shaped protein article with an alcohol or with water.

The invention will appear more clearly from the following detailed description when taken in connection with the accompanying drawings, showing, by way of example, a preferred embodiment of the inventive idea.

Referring now to the drawings.

Figure 1:
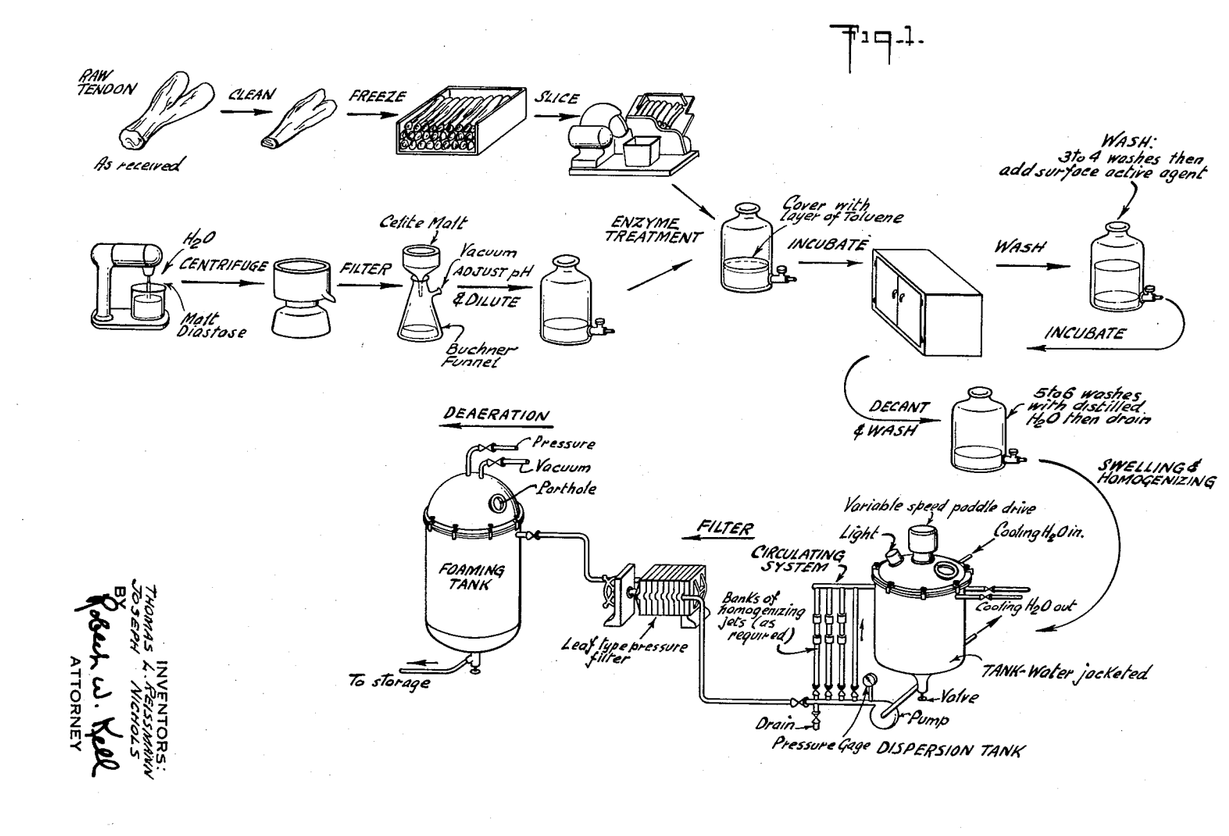
Figure 1 is a flow diagram illustrating the sequence of steps in preparing a dispersion of collagen fibrils from animal tendon.

The general sequence of operations in the formation of a dispersion of pure collagen fibrils is shown by the flow sheet appearing as Figure 1 in the accompanying drawings. By the process to be described, one may disperse the collagen fibrils and remove impurities therefrom without appreciable denaturation or degradation of the collagen structure.

The raw material for the dispersion of this invention is mammalian tendon. Whales are a large source of collagen, and whale tendon is a satisfactory starting material. Pork, sheep and beef tendons are also satisfactory. The best results to date have been obtained using the deep flexor tendon of cattle.

Figure 2:
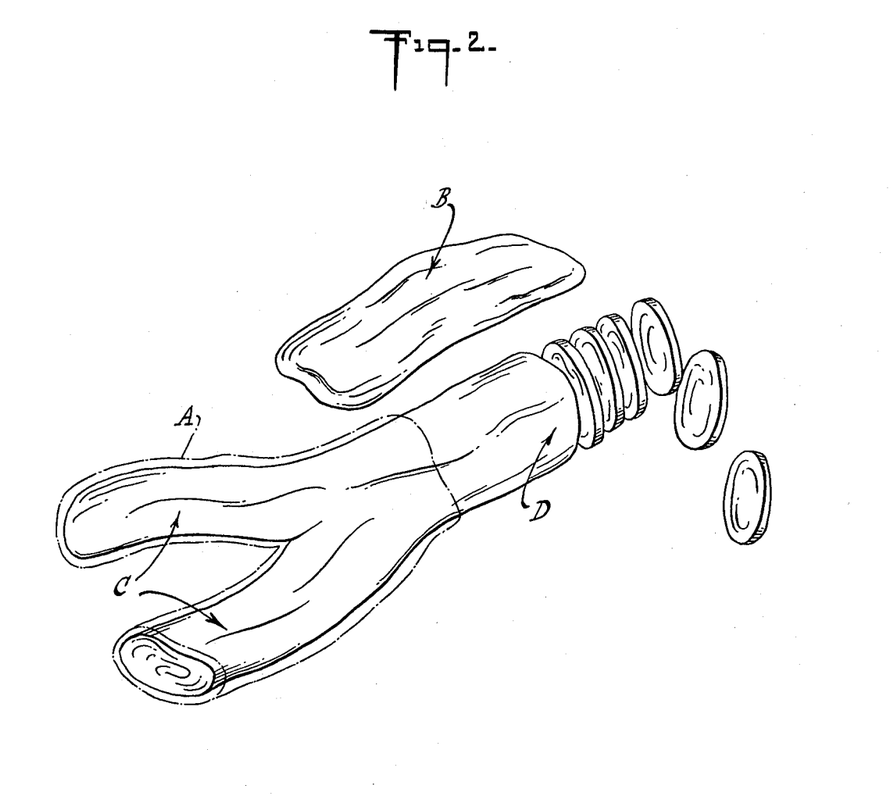
Figure 2 is a drawing of the superficial flexor and deep flexor tendons as obtained from cattle and illustrates that portion of the tendon used in preparing the dispersion of the present invention.

The various sections of bovine tendon are illustrated in Figure 2. In this figure, certain sections of the tendon have been arbitrarily designated by the letters "A" through "D." The "A" portions consist of sheaths (annular ligaments) which surround the two "C" sections. The "A" portions are also connected directly to the "B" tendon (the superficial flexor tendon). The "C" material consists of two small dense shanks which branch off of the larger "D" section. These "C" portions (branches of the deep flexor tendon) contain a large percentage of material that does not swell in acid solutions. That section of the single shank identified by the letter "D" in Figure 2 (the deep flexor tendon) is the preferred portion of the tendon for preparing the collagen dispersion to be described, but the "B" portion may also be used.

With reference to Figure 1, the beef tendons (preferably deep flexor tendons), as shipped from the packing house as received, are frozen to prevent deterioration and must be thawed to permit cleaning the tendon of fat, superficial non-collagenous protein, and other extraneous matter. The clean tendon is then sliced to a thickness of about 10 to 25 mils. Thicker slices swell slowly in aqueous methanol-perfluoro acid solutions and are difficult to disperse. Thinner slices disperse readily but the dispersion, when extruded, has poor tensile strength. Preferably, the tendon sections are sliced across the major axis as lengthwise slicing seems to result in a slower swelling. An aliquot sample of the sliced tendon is analyzed at this time for total solids as the moisture contained in the tendon received from various suppliers and at different times is not constant.

The sliced tendon is next treated with an enzyme solution to dissolve the elastin which encircles the native collagen fibers and ties them together. By this treatment, substantially all of the elastin is dissolved and can be removed. Proteolytic enzymes from either plant or animal sources may be employed to advantage. Pancreatin is an enzyme that is effective in removing elastin. Enzymes derived from plants, such as ficin, are also useful. Another enzyme that will perform this function is one prepared by extracting commercial malt diastase (U.S.P. IX) with water. The tendon-enzyme mixture is stored at room temperature for 15 to 20 hours.

After the enzyme treatment, the tendon slices are washed with water. Soluble proteins and lipids may be removed by treating the slices with a dilute aqueous solution of a chelating agent, such as ethylenediamine tetrasodium tetraacetate. Following this treatment, the tendon slices are washed again to remove residual traces of the chelating agent.

The cleaned tendon slices at this point contain a high percentage of purified collagen associated with material that does not swell in an acid solution. The next step is to swell this collagen in a perfluoro acid solution to form a homogeneous dispersion of collagen fibrils, but it is most important that during this step the individual slices of collagen not be permitted to coalesce. As collagen swells, it becomes sticky and, if the individual collagen slices are permitted to stick together, the interior of the conglomeration will not have contact with the swelling solution. Therefore, to obtain a homogeneous fiber dispersion in a practical time, it is most desirable to prevent coalescence of the individual tendon slices. A dispersion kettle (see Figures 3 and 4) having a paddle 11 positioned off center, as shown in the drawings, is used to minimize lump entanglement. In the dispersion kettle, the collagen slices are slowly stirred in the aqueous methanol perfluoro acid solution. The collagen slices absorb the perfluoro acid solution with swelling.

Temperature becomes a critical factor after addition of acid to the tendon slices as the collagen is degraded in the presence of acids above about 30° C. For this reason, all processing subsequent to the perfluoro acid addition should be carried out at temperatures below about 25° C.

The swelling solution may be an aqueous methanol solution of a saturated perfluorocarbon carboxylic acid having the formula $CF_3(CF_2)_nCOOH$ in which $n$ is zero or a whole integer smaller than 7. While perfluoro acids having from about 2 to 8 carbon atoms have been used in the practice of the present invention, perfluorobutyric acid is preferred. The protection against denaturation that is effected by the perfluoro acids varies with the length of the aliphatic acid chain. If there are fewer than 4 carbon atoms in the perfluoro acid, the addition compound formed with the collagen molecules is less resistant to degradation and, if there are more than 8 carbon atoms in the perfluoro acid, the solubility of the perfluoro acid is so decreased that swelling is retarded. The amount of perfluoro acid present will vary with the equivalent weight of the acid and its ionization constant. In general, however, an acid content of from about 0.20 to about 1 percent of the total weight of the solution is used. The preferred pH is 2–3.

When the collagen dispersion is to be used in the extrusion of filaments, the amount of tendon present in the swelling solution is preferably about 1 percent. A dispersion of collagen fibrils that has a solids content below about 0.8 percent is difficult to spin. On the other hand, a concentration of collagen fibrils greater than 1 percent results in a dispersion that is more difficult to extrude through a spinnerette. More concentrated collagen dispersions (about 6 percent collagen) are preferred when the dispersion is to be extruded through an annular opening to form a tubular article. It is important that a collagen fibril dispersion which is to be extruded be homogeneous, as a small change in the solids concentration of the material being extruded will result in large cross-sectional variations in the final product.

Figure 5:
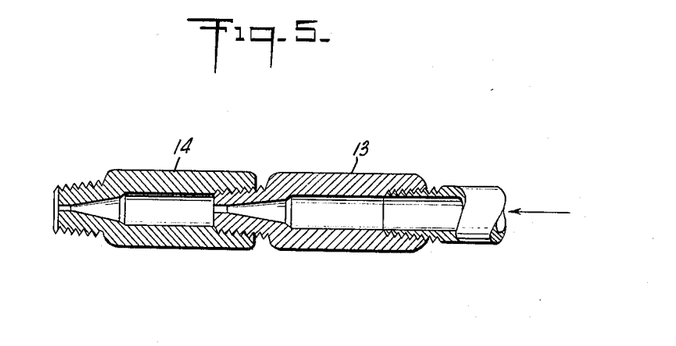
Figure 5 is a detailed sectional view of two homogenization jets of the type that are used in the return line to the dispersion kettle.

After most of the swelling has taken place in the dispersion kettle (Figure 3), the dispersion is homogenized by repeated passes through a stainless steel rotary metering pump 12 and stainless steel series-connected jets 13 and 14 having orifices of about 50 mils and 40 mils, respectively. The internal structure of these jets is illustrated by Figure 5. It will be noted from Figure 3 that these jets are positioned in parallel banks. This readily permits isolating any pair of jets from the system for cleaning.

Stirring is continued during homogenization. Best results are obtained with a slow agitation (60 r.p.m.) during the swelling stage, intermittent agitation (60 r.p.m.) at the beginning of homogenization, and higher speed (120 r.p.m.) intermittent agitation near the end of the homogenization.

Figure 3:
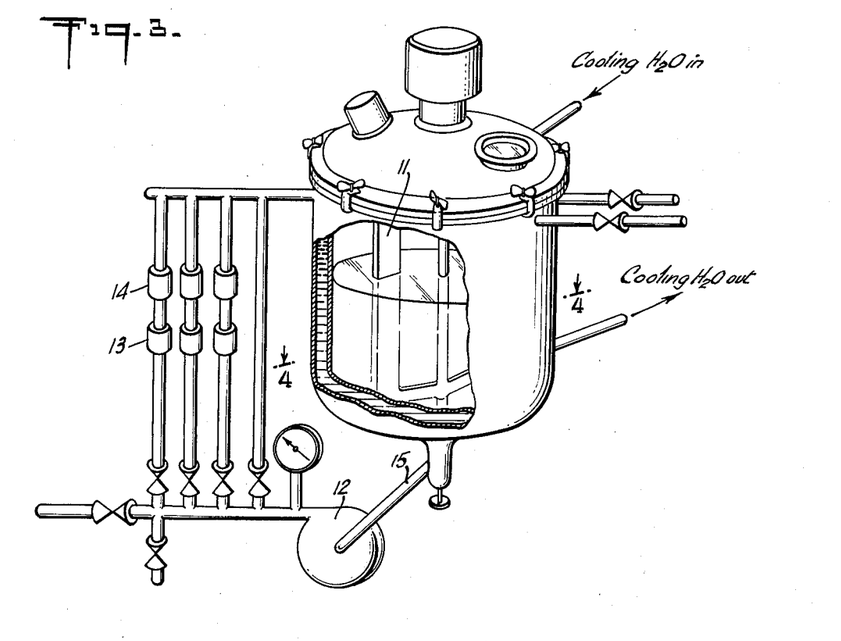
Figure 3 is a sectional view of a kettle that is used to prepare a homogeneous dispersion of collagen fibrils and illustrates the associated circulating pump and homogenizing jets.
Figure 4:
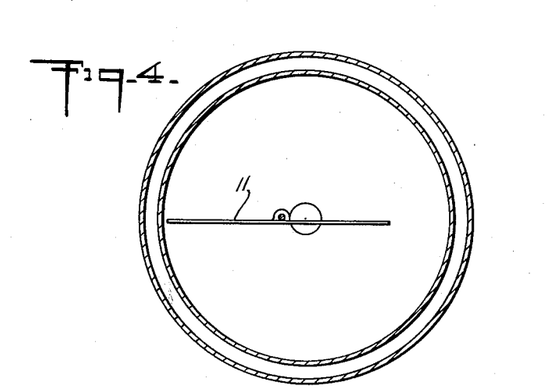
Figure 4 is a sectional view of the dispersion kettle on the line 4—4 of Figure 3.

The homogenizing pump 12 employed in this process is a rotary pump (such as a Zenith pump) that has been modified by milling about 0.003 inch from the circumference of the gear teeth. The intake and exit from the pump are connected to the dispersion kettle by the stainless steel conduit 15 which is capable of withstanding the high pressure.

The homogenizing pump is operated at 190 r.p.m. for two to four hours. The flow rate through the homogenizing jets at the start of this step is irregular and the pressure on the gauge 16 may rise above 200 pounds per square inch. Toward the end of the homogenization step, however, the pressure between the pump and the 50-mil jet 13 is relatively constant at 60 to 80 pounds per square inch.

The dispersion after homogenization still contains fibers of unswollen non-collagenous material which must be removed. This is most readily accomplished by forcing the dispersion under pressure through a leaf filter which retains the unswollen non-collagenous material.

Figure 6:
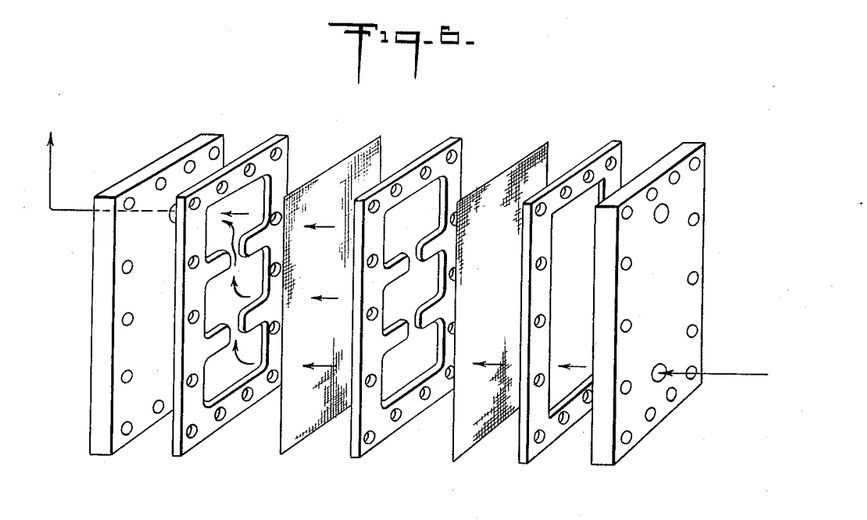
Figure 6 is an exploded view of a screen filter of the type used to remove non-swollen material from the collagen dispersion.

Figure 6 is an exploded view of a leaf filter which may be expanded to include any desired number of screens. A suitable filter may contain three or more screens of #316 stainless steel. These screens are separated by ⅛-inch spacers and decrease in mesh size so that the swollen collagen first passes a 15-mil screen, then a 9-mil screen and finally a 4-mil screen. During the filtration step, the speed of the pump may be varied as necessary to maintain the pressure on the filter below about forty pounds per square inch at all times. Pressures above fifty pounds per square inch may force the non-collagenous impurities into the filtered dispersion.

The dispersion of collagen fibrils after filtration may be deaerated under vacuum and is then ready for storage. If stored at 5° C., or below, the dispersion will remain substantially unchanged for periods in excess of two or three weeks.

Throughout the specification and the examples which follow, all quantities are expressed in parts by weight.

EXAMPLE I

That portion of the deep flexor tendon of cattle designated in Figure 2 as the "D" section, is cleaned of superficial fat, non-collagenous protein, and other extraneous matter and is sliced on an electric meat-slicing machine (rotary knife) in the frozen condition. The tendon sections are sliced perpendicularly to their longitudinal axis to a thickness of about 10 to 25 mils. An aliquot sample of the tendon slices is analyzed for total solids.

The sliced tendon is next treated with an enzyme solution to dissolve elastin. The enzyme solution is prepared by agitating 40 parts of commercial malt diastase (U.S.P. IX) with 400 parts of water for 10 minutes. The homogeneous dispersion is centrifuged at 2000 r.p.m. for 20 minutes, and the clear aqueous solution from the centrifuging step is vacuum filtered through a "Celite" mat. "Celite" is an inert analytical filtering aid manufactured by The Johns-Mansville Company. The filtrate, which is usually slightly acid, is adjusted to pH 7 with a few drops of dilute sodium hydroxide. Distilled water is then added to this neutral enzyme solution to bring the total volume up to 1200 parts. Four hundred parts of the sliced tendon is immersed in this solution, which is then covered with a layer of toluene to prevent mold growth. This tendon-enzyme mixture is incubated at 37.5° C., overnight (15–20 hours).

After incubation, the tendon slices are washed 3 or 4 times by decantation with distilled water and then treated with 1000 parts of water containing 4 parts of "Versene" (ethylenediamine tetrasodium tetraacetate). The tendon-"Versene" mixture is incubated for approximately 2 hours at 37.5° C., to remove soluble proteins and liquids. Following this "Versene" treatment, the pH should again be adjusted to 7 if necessary, as the tendon slices are easier to handle (less swelling and hydration) in a neutral solution. The tendon slices are again washed by decantation with 5 to 6 changes of distilled water.

The swelling solution is 50% aqueous methanol containing about 0.35%, based on the total solvent weight, of perfluorobutyric acid. In general, the collagen dispersion is easy to process at about 1% solids concentration and the amount of acid-swelling solution may be readily calculated from the weight and solids content of the tendon used. For example, the tendons (sliced) employed in making up the present suspension analyze 33% solids (67% moisture), and the total weight of collagen and solid impurities present is approximately 400 parts × 33% = 132 parts In calculating the amount of tendon required to make up a suspension of known concentrations, the weight of tendon solids (on a dry basis) must be multiplied by the factor 1.1 in order to correct for the non-collagenous impurities present in the tendon. This material is not swollen by the acid solution and must be removed from the dispersion. The total weight of a 1% dispersion from 132 parts of tendon would therefore be $$132 \text{ parts} \times \frac{100\%}{1.1\%} = 12{,}000 \text{ parts}$$

The total weight of swelling solution will be 12,000 parts—132 parts=11,968 parts. Due to the water content of the tendon, which at this stage of the process has a wet weight of 2145 parts, an excess of methanol over water is required to produce a true 50% solution. The acid solution is prepared by mixing 6000 parts of methanol $$\left(\frac{12{,}000}{2}\right)$$

with 3987 parts of distilled water (6000 parts—[2145 parts—132 parts]). To this aqueous methanol mixture is added 42 parts of perfluorobutyric acid (12,000 parts ×0.35%).

The aqueous methanol acid solution is cooled to below 25° C., and is added to a dispersion kettle as illustrated in Figure 3, and the processed collagen slices are added to the dispersion kettle while rotating the stirrer at about 60 r.p.m. It is important that the remaining steps in the process be carried out at temperatures below about 25° C., and that the temperature of the collagen dispersion not be allowed to exceed this temperature. An irreversible change in the viscosity of the collagen dispersion may take place above about 30° C.

Stirring is continued for about 3 hours during which time the individual collagen slices are swollen. The dispersion is then homogenized by repeated passes through the stainless steel rotary metering pump 12, described above, and the stainless steel series-connected jets (13 and 14) having orifices of 50 mils and 40 mils respectively. During the homogenization, the stirrer in the dispersion kettle is operated intermittently.

The pressure on the high pressure side of the homogenization jets falls to 70 pounds per square inch and remains constant after 3.5 hours, indicating substantially complete homogenization. The dispersion is then forced through a leaf filter containing three screens of #316 stainless steel. These screens are separated by 1/8-inch spacers and decrease in mesh size so that the dispersion first passes a 14-mil screen, then a 9-mil screen, and finally a 4-mil screen. During the filtration step, the pressure on the filter is maintained below about 40 pounds per square inch at all times.

The dispersion of solvated collagen fibrils after filtration weighed approximately 11,000 parts (0.9% solids). Six hundred parts of material is held up in the filter. The dispersion is an opaque, thixotropic mass which, at room temperature, assumes a very viscous, slowly flowable state. At 15° C., the viscosity of this dispersion (determined by a Brabender "Plastigraph" machine) is 440 Brabender units. This may be compared with glycerine which at 7.5 C., has a viscosity of 51 poises, in the "Plastigraph" machine gives a reading of 420 Brabender units. The viscosity of this dispersion at other temperatures is summarized in Table 1.

Table 1

| Consistency | Temperature, °C. | Log Consistency | 1/T×10⁴ |
|---|---|---|---|
| 440 | 15 | 2.644 | 34.70 |
| 360 | 20 | 2.556 | 34.11 |
| 319 | 25 | 2.504 | 33.54 |
| 283 | 30 | 2.452 | 32.99 |
| 123 | 35 | 2.090 | 32.45 |
| 33 | 40 | 1.518 | 31.93 |

Figure 8:
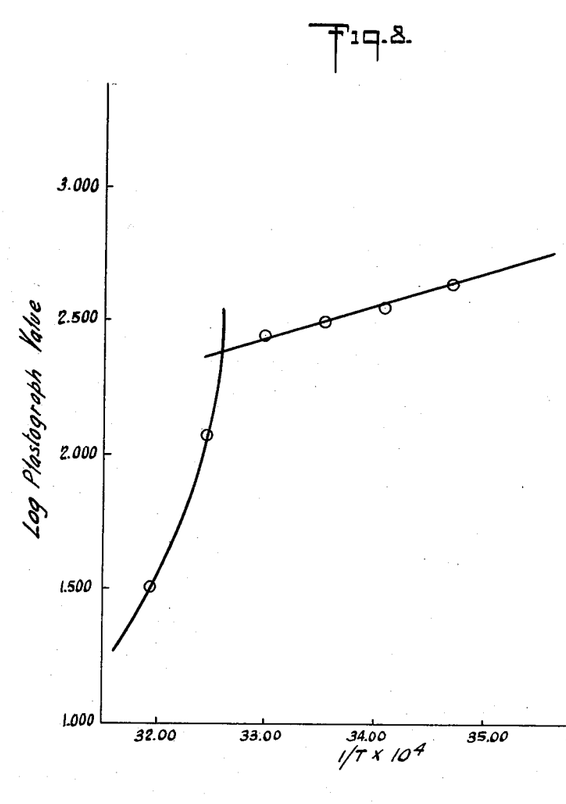
Figure 8 is a graph of the relationship between the viscosity of a collagen dispersion prepared according to the present invention and the absolute temperature.

From Figure 8, which relates the reciprocal of the absolute temperature to the log of the consistency, it is apparent that some irreversible physical change occurs at about 34° C. No irreversible viscosity change was observed below 30° C.

The dispersion prepared according to Example I has an activation energy of 5.3 kilogram calories per mole below the transition temperature of about 34° C.; the activation energy above the transition temperature is 70 kilogram calories per mole. It has been noted that dispersions prepared by the procedure described above have activation energies between 3.2 and 5.3 kilogram calories per mole below the transition temperature of about 34° C. Above 34° C., the activation energy is about 70 kilogram calories per mole or less.

Figure 7:
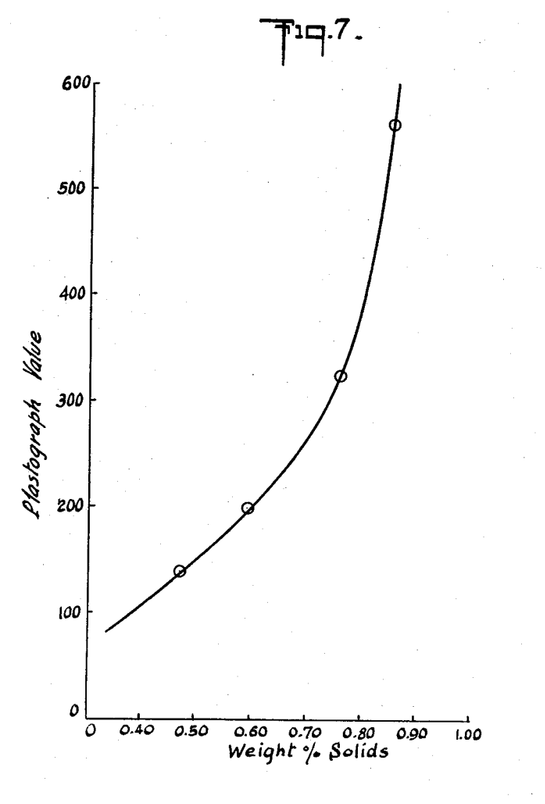
Figure 7 is a graph of the relationship between the viscosity of a collagen dispersion prepared according to the present invention and the solids concentration.

The variation of the viscosity in Brabender units with the concentration of collagen, and the variation in viscosity among the different dispersions prepared according to the method of Example I, is shown in Figure 7.

The dispersion may be dehydrated under mild conditions to recover highly purified collagen fibers or may be extruded to form collagen filaments.

Surgical sponges may be made by freeze-drying the collagen dispersion of this example. The collagen dispersion may also be extruded through an annular orifice into a dehydrating bath to form tubular shapes. Such collagen tubes are washed, and tanned to give edible products suitable for sausage casings.

Figure 9:
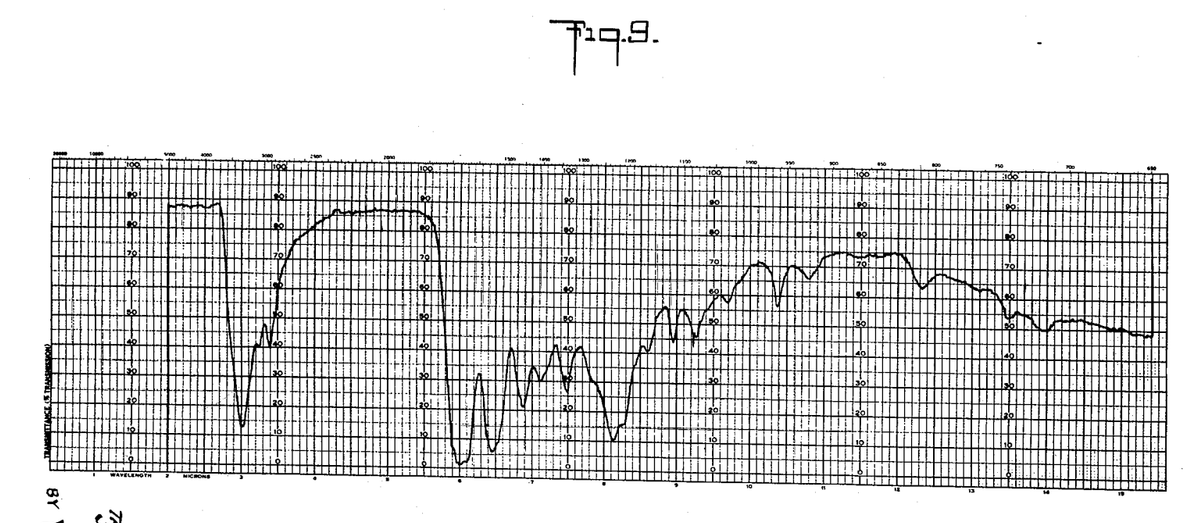
Figure 9 is the infra-red spectrum of a film cast from a perfluoro acid dispersion of collagen.

A characteristic infra-red spectrum of a perfluoro butyric acid dispersion is obtained by casting a thin film and determining the transmittance of the air-dried film with a Perkin-Elmer infra-red recording spectrophotometer. The infra-red spectrum is reproduced in Figure 9.

EXAMPLE II

Four hundred and fifty parts by weight of the collagen dispersion of Example I are dialyzed for 10 days at 5° C., against 0.15 molar sodium citrate buffer at pH 2.6 to remove as much perfluoro butyric acid as possible, and the resulting dispersion is then extracted with 480 parts by weight of the sodium citrate buffer at pH 2.6, for 3 days at 5° C., and is spun down in the centrifuge (4000 g.) at 5° C. The supernatant, containing the soluble collagen fraction, is dialyzed against a large volume of 0.02 molar sodium acetate buffer for approximately 8 days, with the resulting formation of a precipitate. This precipitate is spun down at low speeds, washed repeatedly with cold water and then lyophilized. All of the above operations are completed in the cold (from 2° C., to 5° C.). The yield of lyophilized tropocollagen is 85 milligrams. The anthrone results for hexoses on this sample is 0.42 percent, the axial ratio of this tropocollagen is 276:1.

EXAMPLE III

The collagen dispersion described in Example I above is deaerated just prior to spinning in a large vacuum desiccator at about 15 mm. of mercury for 2 or 3 hours and then extruded through a spinnerette into a dehydrating bath and the multifilament so obtained is stretched, twisted, tanned, and then again stretched and twisted to coalesce the multifilaments and form a self-bonded unitary strand. This strand (244 denier) after sterilization had the following properties:

|  | Grams per denier |
|---|---|
| Wet straight tensile strength | 3.72 |
| Dry knot tensile strength | 2.36 |
| Wet knot tensile strength | 1.79 |

EXAMPLE IV

That portion of the deep flexor tendon of young steers described in Example I is cleaned of fat, superficial non-collagenous protein and other extraneous matter, and is sliced perpendicularly to the longitudinal axis to a thickness of about 11 mils. The analysis for total solids on an aliquot sample of these tendon slices is 39.5%.

Seventy-five parts of the tendon slices are treated with 750 parts of a solution containing 0.15 parts of ficin, 0.13 part of the disodium salt of ethylenediamine tetraacetic acid and 0.247 part of ethylenediamine tetrasodium tetraacetate. After standing for 17 hours at room temperature, 2.25 parts of 30% hydrogen peroxide are added.

The swelling solution is made by adding 8.44 parts of trifluoroacetic acid to a mixture of 808 parts of water and 1645 parts of methanol. This swelling solution is added to the tendon slices without decanting the hydrogen peroxide solution. The calculated dry solids in the mixture so obtained amount to 1.1% of the total weight (solids and swelling solution).

The mixture is homogenized by the procedure described in Example I above. The homogenized dispersion is filtered through a leaf filter containing 15-, 9- and 5.5-mil screens. The pH of the dispersion so obtained, which analyzes 0.98% solids, is 2.22.

The dispersion of swollen collagen fibrils is deaerated under vacuum and then extruded through a spinnerette into a dehydrating bath. The multifilament so obtained is stretched, twisted, tanned, and then again stretched and twisted to unite the multifilaments to form a strand.

This strand (denier 245) after sterilization has a dry straight tensile strength of 4.00 grams per denier, a dry knot strength of 2.18 grams per denier and a wet knot strength of 1.85 grams per denier.

The invention herein described differs from such as embody the production of collagen dispersions in this respect, that it consists of dispersing native collagen fibers that are neither denatured nor degraded in aqueous solutions of methanol and perfluoro acids. It is an advantage of the dispersion of this invention that even minute air bubbles, which would cause breaks in the extruded filaments, may be easily removed under vacuum. The aqueous methanol perfluoro acid dispersions may be completely deaerated at 15 mm. of mercury within 2 or 3 hours whereas it would require several days for removal of all air bubbles from a water dispersion that contained no methanol. The methanol also lowers the specific gravity of the aqueous dispersion and makes it easier to spin.

The present application is a continuation-in-part of copending application Serial No. 695,150, filed November 7, 1957. The broad process of preparing a dispersion of swollen collagen fibers in aqueous perfluoro acid solutions is not claimed herein, but that subject matter is described and claimed in copending application Serial No. 695,151, filed November 7, 1957. The enzyme treatment of finely divided collagen to remove elastin fibers is described and claimed in copending application Serial No. 713,313, filed February 5, 1958. The mechanical spinning of collagen dispersions to form a suture material is described and claimed in copending application Serial No. 768,969, filed October 22, 1958.

While the invention has been described in detail according to the preferred manner of carrying out the process and yielding the products, it will be obvious to those skilled in the art, after understanding the invention, that changes and modifications may be made therein without departing from the spirit or scope of the invention, and it is intended to cover all such changes and modifications in the appended claims.

What is claimed is:

1. In a process for the extrusion of a homogeneous collagen dispersion to form a shaped article, the improvement which comprises swelling and dispersing collagen fibers derived from animal tendons in an aqueous methanol solution of a perfluoro acid having the formula $CF_3(CF_2)_nCOOH$, in which $n$ is a whole integer smaller than 7, said methanol amounting to about 50 percent of the total weight of the aqueous methanol solution.

2. In a process for the extrusion of a homogeneous collagen dispersion to form a shaped article, the improvement which comprises swelling and dispersing the collagen fibers while maintaining the temperature below about 25° C., in an aqueous methanol solution of a perfluoro acid having the formula $CF_3(CF_2)_nCOOH$, in which $n$ is a whole integer smaller than 7, said methanol amounting to about 50 percent of the total weight of the aqueous methanol solution.

3. A dispersion of swollen collagen fibers in a dispersant consisting essentially of an aqueous methanol solution of a perfluoro acid having the formula $$CF_3(CF_2)_nCOOH$$

in which $n$ is a whole integer smaller than 7, said methanol amounting to about 50 percent of the total weight of the dispersant.

4. A dispersion of swollen collagen fibers in a dispersant consisting essentially of an aqueous methanol solution of perfluorobutyric acid having the formula $CF_3(CF_2)_2COOH$, said methanol amounting to about 50 percent of the total weight of the dispersant.

5. A dispersion of swollen collagen fibers in a dispersant consisting essentially of an aqueous methanol solution of a trifluoroacetic acid having the formula CF₃COOH, said methanol amounting to about 50 percent of the total weight of the dispersant.

6. A dispersion of swollen collagen fibers in a dispersant consisting essentially of an aqueous methanol solution of a perfluoro acid having the formula $$CF_3(CF_2)_nCOOH$$

in which $n$ is a whole integer smaller than 7, said methanol amounting to about 50 percent of the total weight of the dispersant, and said perfluoro acid amounting to between 0.2 percent and 1.0 percent of the total weight of the dispersant.

7. A dispersion of swollen collagen fibers in a dispersant consisting essentially of an aqueous methanol solution of a perfluoro acid having the formula $$CF_3(CF_2)_nCOOH$$

in which $n$ is a whole integer smaller than 7, said methanol amounting to about 50 percent of the total weight of the dispersant, and said dispersion having an activation energy between 3.2 and 5.3 kilogram calories per mole.

References Cited in the file of this patent

UNITED STATES PATENTS

| | | |
|---|---|---|
| 2,622,036 | Alexander et al. | Dec. 16, 1952 |
| 2,631,942 | Highberger | Mar. 17, 1953 |